United States Patent
Shogaki

(10) Patent No.: US 10,831,413 B2
(45) Date of Patent: Nov. 10, 2020

(54) PRINTING APPARATUS THAT DISPLAYS NOTIFICATION SCREEN AND THAT EXECUTES PRINT JOB, CONTROL METHOD THEREFOR, AND STORAGE MEDIUM

(71) Applicant: CANON KABUSHIKI KAISHA, Tokyo (JP)

(72) Inventor: Yohei Shogaki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/390,296

(22) Filed: Apr. 22, 2019

(65) Prior Publication Data

US 2019/0332333 A1   Oct. 31, 2019

(30) Foreign Application Priority Data

Apr. 26, 2018 (JP) .................. 2018-085204

(51) Int. Cl.
  *G06F 3/12* (2006.01)
(52) U.S. Cl.
  CPC .......... *G06F 3/1204* (2013.01); *G06F 3/1208* (2013.01); *G06F 3/1256* (2013.01); *G06F 3/1257* (2013.01)
(58) Field of Classification Search
  None
  See application file for complete search history.

(56) References Cited

U.S. PATENT DOCUMENTS

| 8,422,045 | B2 | 4/2013 | Yamada | |
|---|---|---|---|---|
| 2003/0030664 | A1* | 2/2003 | Parry | G06F 9/4411 715/744 |
| 2013/0050731 | A1* | 2/2013 | Fukuoh | G06F 3/1258 358/1.13 |
| 2018/0217797 | A1* | 8/2018 | Inoue | H04N 1/00482 |
| 2018/0220015 | A1* | 8/2018 | Akuzawa | H04N 1/21 |
| 2019/0220237 | A1* | 7/2019 | Maeda | G06F 3/1253 |

FOREIGN PATENT DOCUMENTS

JP    2008087177 A    4/2008

* cited by examiner

*Primary Examiner* — Gabriel I Garcia
(74) *Attorney, Agent, or Firm* — Rossi, Kimms & McDowell LLP

(57) ABSTRACT

A printing apparatus which is capable of preventing printing from being performed based on setting histories against user's will. The printing apparatus displays a setting call button for calling data to be printed and print setting information. A character string for identifying the data is displayed on the setting call button. It is determined whether or not all of the character string is displayed on the setting call button. When a user has selected the setting call button on which at least a part of the character string is not displayed, a notification screen that prompts a user to confirm the data to be printed is displayed.

6 Claims, 24 Drawing Sheets

FIG. 4

| USER ID 401 | USER NAME 402 | DOMAIN NAME 403 | PASSWORD 404 | E-MAIL ADDRESS 405 | ADMINISTRATOR RIGHT 406 |
|---|---|---|---|---|---|
| 00001 | tanaka | - | 012345 | tanaka@abc.co.jp | FALSE |
| 00002 | yamada | - | 999999 | yamada@abc.co.jp | FALSE |
| 00003 | shimizu | CANAN | 987654 | shimizu@canan.com | TRUE |
| 00004 | sato | - | aaaaaa | sato@abc.co.jp | FALSE |

| 1201 | 1202 | 1203 | 1204 | 1205 | 1206 | 1207 | 1208 | 1209 |
|---|---|---|---|---|---|---|---|---|
| CUSTOM BUTTON ID | BUTTON TYPE | OWNER USER ID | BUTTON NAME | APPLICATION TYPE | UPDATE DATE | APPLICATION DATA | CONFIRMATION SETTING | IMMEDIATE EXECUTION SETTING |
| 1 | SHARED BUTTON | – | WRITTEN OATH 2 COPIES, MONOCHROME, ONE-SIDED | COPY | 2016/12/15 13:01:22 | COLOR MODE/MONOCHROME SHEET SIZE/A4 PAGE AGGREGATION/1 in 1 ZOOM RATE/125% NUMBER OF COPIES/2 DOUBLE-SIDED/DOUBLE-SIDED | ON | OFF |
| 2 | SHARED BUTTON | – | SAVE MINUTES OF MEETING | SCAN AND SAVE | 2017/01/03 11:11:43 | FOLDER PATH/ "/folder/abc" FILE NAME/"MINUTES OF MEETING.pdf" COLOR MODE/FULL COLOR SHEET SIZE/A4 ZOOM RATE/100% | ON | ON |
| 3 | MY BUTTON | 00002 | SEND QUOTE | SCAN AND SEND | 2017/01/15 08:33:25 | DESTINATION ADDRESS/"yamada@abc.co.jp" FILE NAME/"QUOTE.pdf" COLOR MODE/AUTO SHEET SIZE/A3 ZOOM RATE/100% | OFF | OFF |
| 4 | MY BUTTON | 00001 | REQUEST SHEET | COPY | 2017/01/24 17:09:00 | COLOR MODE/MONOCHROME SHEET SIZE/B5 PAGE AGGREGATION/2 in 1 ZOOM RATE/100% NUMBER OF COPIES/1 DOUBLE-SIDED/ONE-SIDED | OFF | ON |

| CUSTOM BUTTON ID | BUTTON TYPE | OWNER USER ID | BUTTON NAME | APPLICATION TYPE | UPDATE DATE | APPLICATION DATA | CONFIRMATION SETTING | IMMEDIATE EXECUTION SETTING |
|---|---|---|---|---|---|---|---|---|
| 5 | SHARED BUTTON | — | AUTHORIZATION SHEET | COPY | 2017/03/14 07:29:30 | COLOR MODE/MONOCHROME<br>SHEET SIZE/B4<br>FINISH/PUNCH<br>ZOOM RATE/144%<br>NUMBER OF COPIES/2<br>DOUBLE-SIDED/DOUBLE-SIDED | OFF | OFF |

| CUSTOM BUTTON ID | BUTTON TYPE | OWNER USER ID | BUTTON NAME | APPLICATION TYPE | UPDATE DATE | APPLICATION DATA | CONFIRMATION SETTING | IMMEDIATE EXECUTION SETTING |
|---|---|---|---|---|---|---|---|---|
| 1 | SHARED BUTTON | – | WRITTEN OATH 2 COPIES, MONOCHROME, ONE-SIDED | COPY | 2016/12/15 13:01:22 | COLOR MODE/MONOCHROME SHEET SIZE/A4 PAGE AGGREGATION/1 in 1 ZOOM RATE/125% NUMBER OF COPIES/2 DOUBLE-SIDED/DOUBLE-SIDED | ON | OFF |

| 1801 | 1802 | 1803 | 1804 | 1805 | 1806 | 1807 | 1808 |
|---|---|---|---|---|---|---|---|
| RECORD ID | RECORD TYPE | OWNER USER ID | RECORD NAME | APPLICATION TYPE | UPDATE DATE | APPLICATION DATA | SCREEN TRANSITION SETTING |
| 1 | SHARED RECORD | — | MONOCHROME A4 125% | COPY | 2016/11/25 03:51:22 | COLOR MODE/MONOCHROME SHEET SIZE/A4 PAGE AGGREGATION/1 in 1 ZOOM RATE/125% NUMBER OF COPIES/2 DOUBLE-SIDED/DOUBLE-SIDED | JOB SETTING SCREEN |
| 2 | MY RECORD | 00001 | /folder/abc/MINUTES OF MEETING.pdf | USE SAVED FILE | 2017/03/04 09:11:43 | FOLDER PATH/ "/folder/abc" FILE NAME/"MINUTES OF MEETING.pdf" COLOR MODE/FULL COLOR SHEET SIZE/A4 ZOOM RATE/100% | FILE SELECTION SCREEN |
| 3 | MY RECORD | 00002 | /folder/abc/QUOTE.pdf | USE SAVED FILE | 2017/03/02 12:23:05 | FOLDER PATH/ "/folder/abc" FILE NAME/"QUOTE.pdf" COLOR MODE/MONOCHROME SHEET SIZE/A3 ZOOM RATE/100% | JOB SETTING SCREEN |
| 4 | MY RECORD | 00003 | MONOCHROME B5 2in1 | COPY | 2017/02/24 15:29:50 | COLOR MODE/MONOCHROME SHEET SIZE/B5 PAGE AGGREGATION/2 in 1 ZOOM RATE/100% NUMBER OF COPIES/1 DOUBLE-SIDED/ONE-SIDED | JOB SETTING SCREEN |

| RECORD ID | RECORD TYPE | OWNER USER ID | RECORD NAME | APPLICATION TYPE | UPDATE DATE | APPLICATION DATA | SCREEN TRANSITION SETTING |
|---|---|---|---|---|---|---|---|
| 5 | MY RECORD | 00001 | /MINUTES OF MEETING/0304.pdf | USE SAVED FILE | 2017/05/27 19:13:13 | FOLDER PATH/"MINUTES OF MEETING" FILE NAME/"0304.pdf" COLOR MODE/FULL COLOR SHEET SIZE/A4 FINISH/SORT DOUBLE-SIDED/ONE-SIDED | FILE SELECTION SCREEN |

| RECORD ID | RECORD TYPE | OWNER USER ID | RECORD NAME | APPLICATION TYPE | UPDATE DATE | APPLICATION DATA | SCREEN TRANSITION SETTING |
|---|---|---|---|---|---|---|---|
| 2 | MY RECORD | 00001 | /folder/abc/MINUTES OF MEETING.pdf | USE SAVED FILE | 2017/03/04 09:11:43 | FOLDER PATH/"/folder/abc" FILE NAME/"MINUTES OF MEETING.pdf" COLOR MODE/FULL COLOR SHEET SIZE/A4 ZOOM RATE/100% | FILE SELECTION SCREEN |

PRINTING APPARATUS THAT DISPLAYS NOTIFICATION SCREEN AND THAT EXECUTES PRINT JOB, CONTROL METHOD THEREFOR, AND STORAGE MEDIUM

BACKGROUND OF THE INVENTION

Field of the Invention

The present invention relates to a printing apparatus, a control method therefor, and a storage medium.

Description of the Related Art

An MFP which is a printing apparatus executing a print job in accordance with an instruction issued by a user is known. When instructing the MFP to execute a print job, the user sets execution conditions for the print job, for example, print setting information such as a designation of a document file (hereafter referred to merely as a "file") to be printed, a sheet size, and the number of copies. In general, the MFP is shared by a plurality of users in many cases. For this reason, in the MFP, when a predetermined time period has elapsed, execution conditions used by one user are automatically cleared so as to prevent other users from using the execution conditions without noticing. In this usage pattern, the user needs to set execution conditions whenever he or she performs printing on the same execution conditions, and this is inconvenient. Accordingly, for example, a reprint function has conventionally been used. With the reprint function, the same settings are used based on setting histories of print jobs executed in the past, and more specifically, the same file is printed with the same print setting information (see, for example, Japanese Laid-Open Patent Publication (Kokai) No. 2008-87177). This enables the user to easily issue an executing instruction based on execution conditions set in the past without performing complicated registration operation.

With the reprint function described above, however, there may be cases where, an instruction to perform printing is issued based on the setting histories without the user designating a file to be printed or inputting print setting information, and printing is started without the user confirming a name of a file to be printed. As a result, the conventional technique presents a problem that a file different from a desired file is printed against user's will.

SUMMARY OF THE INVENTION

The present invention provides a printing apparatus and a control method therefor, which are capable of preventing printing from being performed based on setting histories against user's will, as well as a storage medium.

Accordingly, the present invention provides a printing apparatus that displays a setting call button for calling data to be printed and print setting information, comprising a button display control unit configured to provide control to display a character string for identifying the data on the setting call button, a determination unit configured to determine whether or not all of the character string is displayed on the setting call button, and a control unit configured to, when a user has selected the setting call button on which at least a part of the character string is not displayed, provide control to display a notification screen that prompts the user to confirm the data to be printed.

According to the present invention, printing is prevented from being performed based on setting histories against user's will.

Further features of the present invention will become apparent from the following description of exemplary embodiments (with reference to the attached drawings).

BRIEF DESCRIPTION OF THE DRAWINGS

FIG. 4 is a view showing an example of a user information DB which is managed by the MFP in FIG. 1.

FIG. 12 is a view showing an example of custom button information which is managed by the MFP in FIG. 1.

FIG. 13 is a view showing an example of custom button-related information which is generated by the process in FIG. 9.

FIG. 15 is a view showing an example of custom button-related information which is used in the process in FIG. 14.

FIG. 18 is a view showing an example of record information which is managed by the MFP in FIG. 1.

FIG. 19 is a view showing an example of a setting history which is generated by the process in FIG. 16.

FIG. 23 is a view showing an example of a setting history which is used in the process in FIG. 21.

DESCRIPTION OF THE EMBODIMENTS

An embodiment of the present invention will now be described in detail with reference to the drawings.

Figure 1:
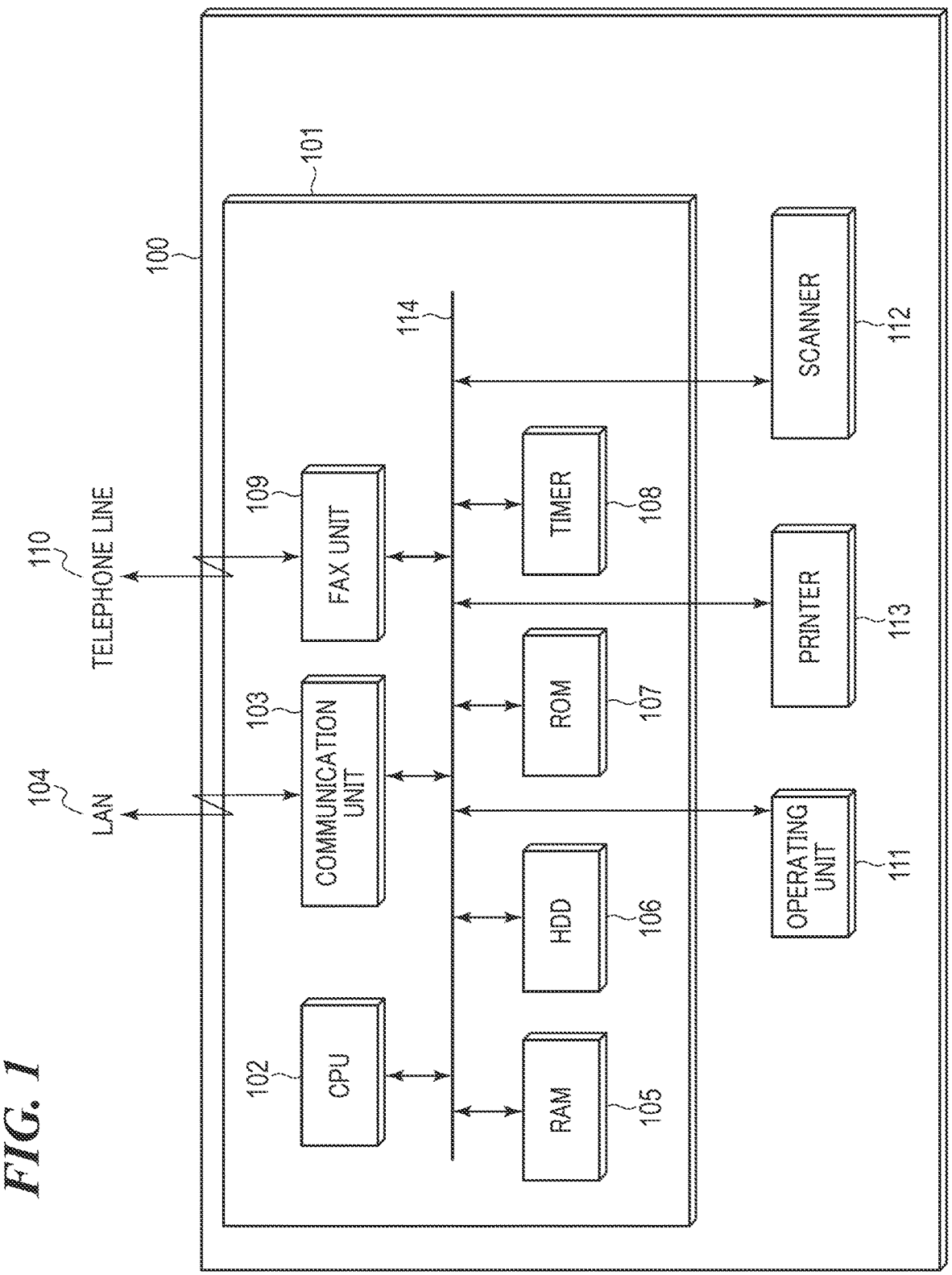
FIG. 1 is a block diagram schematically showing an arrangement of an MFP which is a printing apparatus according to an embodiment of the present invention.

FIG. 1 is a block diagram schematically showing an arrangement of an MFP 100 which is a printing apparatus according to the embodiment of the present invention.

Referring to FIG. 1, the MFP 100 has a controller unit 101, an operating unit 111, a scanner 112, and a printer 113 as units. The controller unit 101 is connected to the operating unit 111, the scanner 112, and the printer 113. The controller unit 101 has a CPU 102, a communication unit 103, a RAM 105, an HDD 106, a ROM 107, a timer 108, and a fax unit 109. The CPU 102, the communication unit 103, the RAM 105, the HDD 106, the ROM 107, the timer 108, and the fax unit 109 are connected to one another via a system bus 114.

The MFP 100 has a plurality of functions such as a copying function, a scanning function, a printing function, a fax communication function, and an authentication function. The MFP 100 uses these functions to execute jobs. The MFP 100 is able to expand its functions by additionally installing applications from outside the MFP 100 via the communication unit 103. The control unit 101 controls operation of the units connected thereto. The CPU 102 controls the entire control unit 101. The communication unit 103 sends and receives data to and from an external apparatus (not shown) via the LAN 104. The LAN 104 is a network for the MFP 100 to send and receive data to and from the external apparatus. The MFP 100 is connected to the Internet via the LAN 104. The RAM 105 is used as system work memory for the CPU 102. The HDD 106 is a hard disk drive. The HDD 106 is a storage medium such as a magnetic disk, an optical medium, or a flash memory. The HDD 106 stores files, setting data, programs, and so forth. It should be noted that in the present embodiment, the HDD 106 may not be incorporated in the MFP 100. For example, a storage of a server or PC, not shown, may be used as an alternative to the HDD 106 via the communication unit 103.

The ROM 107, which is a boot ROM, stores a system boot program. The CPU 102 expands programs stored in the HDD 106 and the ROM 107 into the RAM 105 and provides various types of control based on the expanded programs. The timer 108 starts measuring the amount of time in accordance with an instruction from the CPU 102. When a time period designated in advance has elapsed since the timer 108 started measuring the amount of time, the timer 108 sends an interruption notification to the CPU 102. The fax unit 109 sends and receives fax data to and from the external apparatus, which is capable of carrying out facsimile communications, via a telephone line 110.

Figure 2:
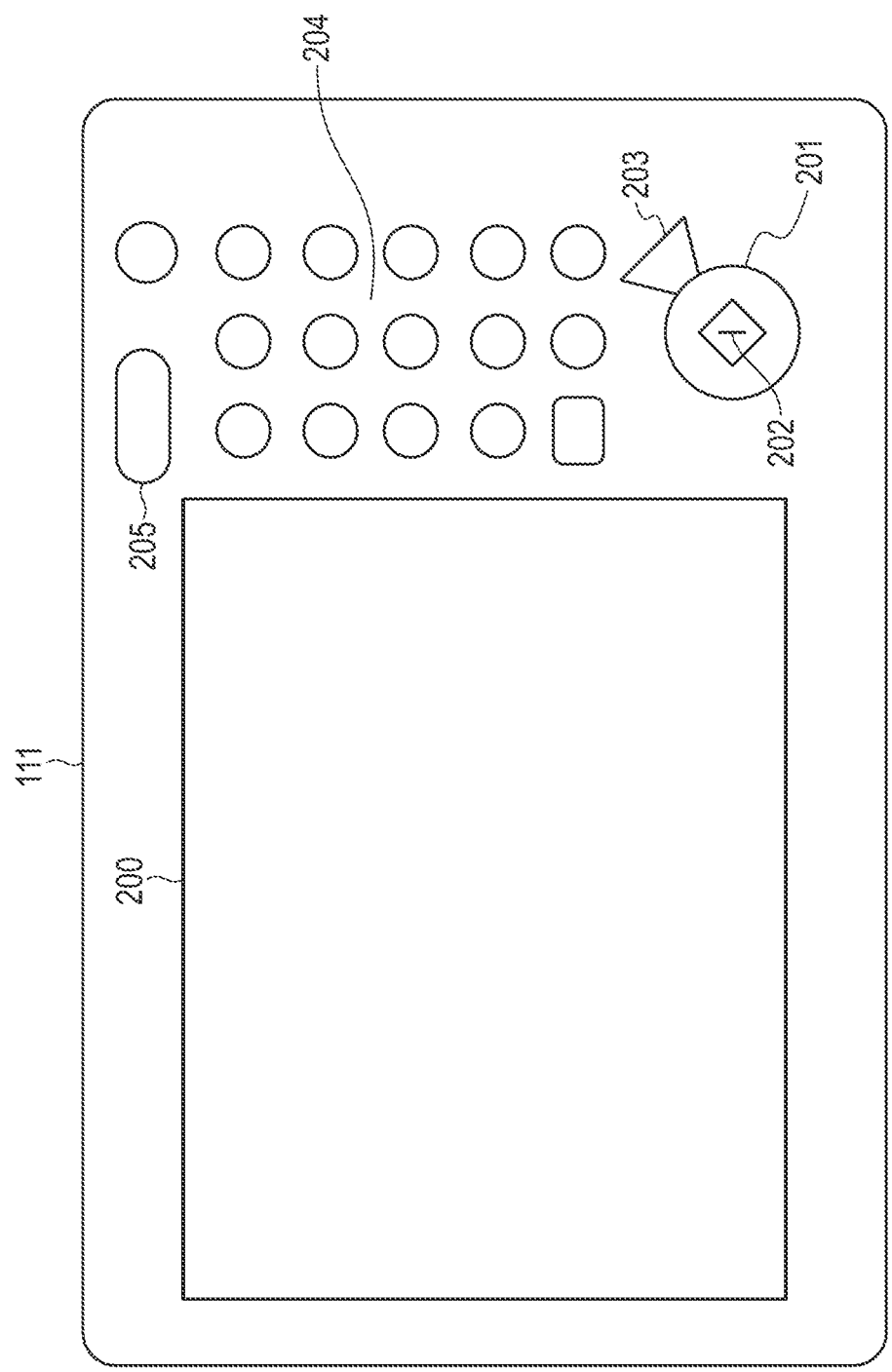
FIG. 2 is an external view of an operating unit in FIG. 1.
Figure 5A:
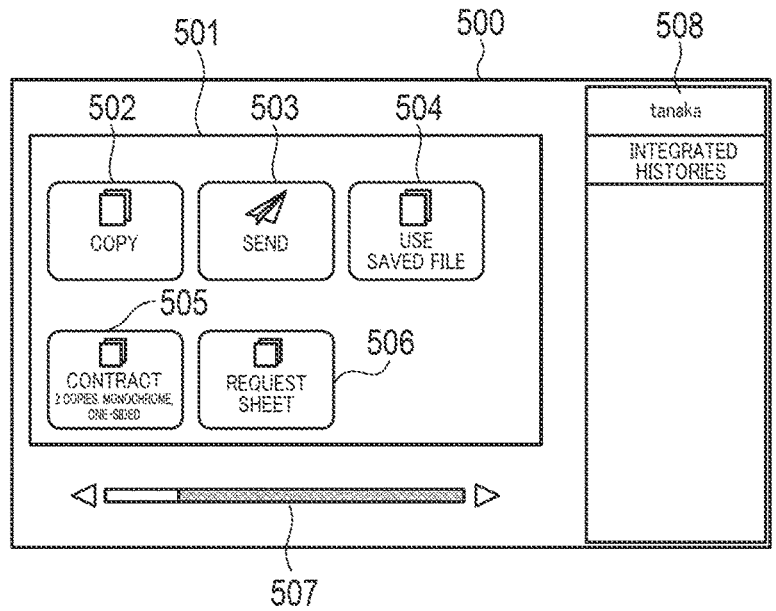
FIGS. 5A to 5C are views showing examples of a home screen which is displayed on a touch panel in FIG. 2.

The operating unit 111 displays a variety of information about the MFP 100. The operating unit 111 also receives a job executing instruction, a setting changing instruction, and so forth from a user. As shown in FIG. 2, the operating unit 111 has a touch panel 200, a start key 201, an LED 202, a stop key 203, a numeric keypad 204, and a home key 205. The touch panel 200 is a liquid crystal display, and a surface of its liquid crystal is covered with a touch panel sheet. The touch panel 200 displays an operating screen and a software keypad. When the user depresses the software keypad displayed on the touch panel 200, the operating unit 111 sends positional information indicating a depressed position to the CPU 102. The start key 201 is used when, for example, the user issues an instruction to start reading an original. A central area of the start key 201 is comprised of LEDs 202 of two colors i.e. green and red. The color that lights up indicates whether or not the start key 201 is allowed to be used. The stop key 203 is used when, for example, the user issues an instruction to stop an operation being performed. The numeric keypad 204, which is comprised of numeral and character buttons, is used when, for example, the user sets the number of copies and issues an instruction to switch screens on the touch panel 200. The home key 205 is used to, for example, display a home screen 500 in FIG. 5A, to be described later, on the touch panel 200. It should be noted that the operating buttons such as the start key 201, the stop key 203, the numeric keypad 204, and the home key 205 are examples, and the operating unit 111 may be equipped with other operating buttons as well as the above operating buttons. The above operating keys may be placed as software buttons on the touch panel 200.

The scanner 112 scans a placed original and generates image data by digitalizing an image on the original and then stores the generated image data in the RAM 105 or the HDD 106. The printer 113 prints files and others stored in the RAM 105 and the HDD 106.

Figure 3:
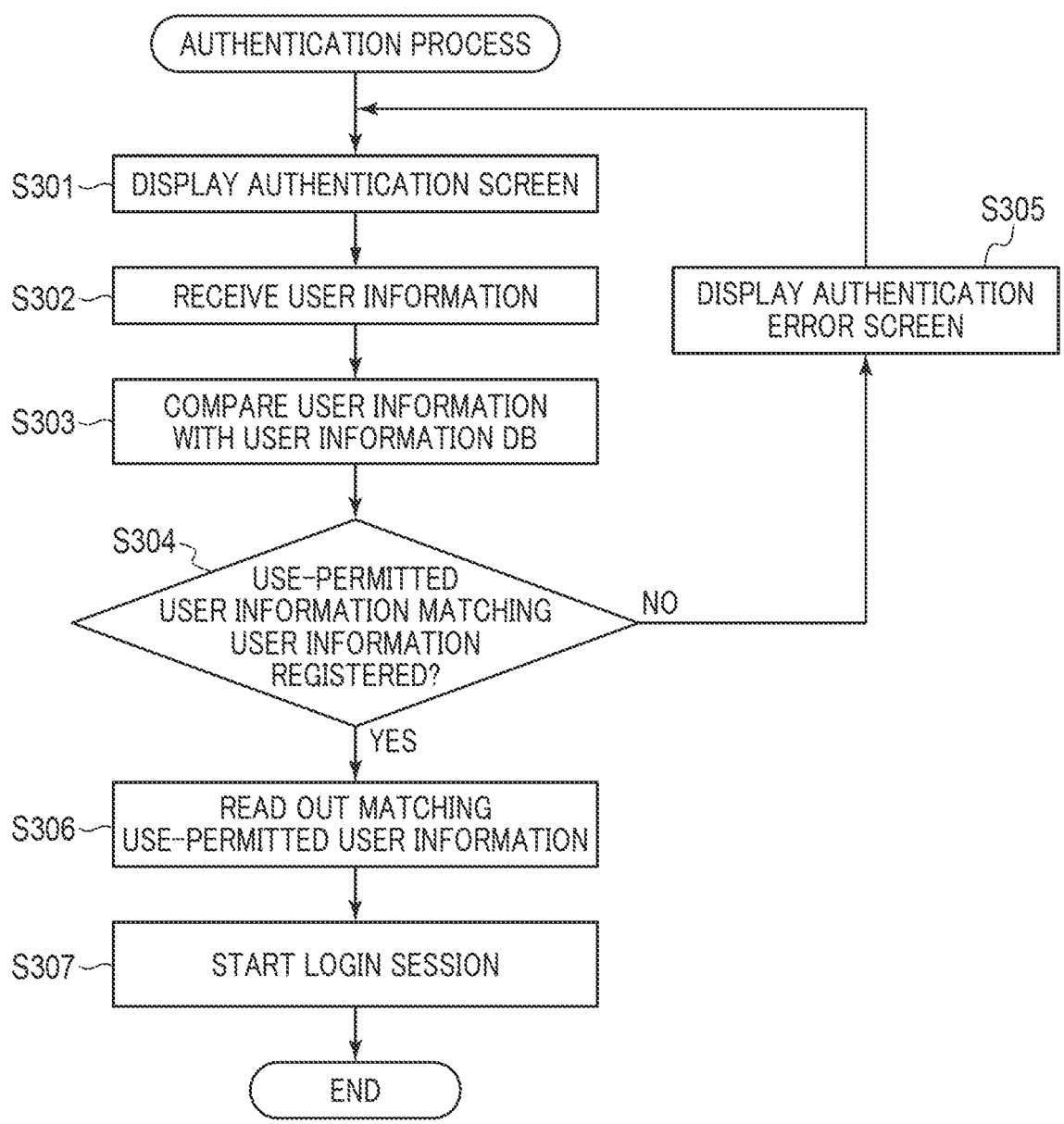
FIG. 3 is a flowchart showing the procedure of an authentication process which is carried out by a CPU in FIG. 1.

FIG. 3 is a flowchart showing the procedure of an authentication process which is carried out by the CPU 102 in FIG. 1. The process in FIG. 3 is implemented by the CPU 102 executing programs in the ROM 107 or the like and is carried out when, for example, an authentication request issued by a user is received via the operating unit 111. The process in FIG. 3 is based on the assumption that information about the user permitted to use the MFP 100 (hereafter referred to as "the use permitted user information") was registered in advance. In the MFP 100, the use permitted user information is managed by a user information DB 400 in FIG. 4 stored in the HDD 106. The user information DB 400 includes user IDs 401, user names 402, domain names 403, passwords 404, e-mail addresses 405, and administrator rights 406. Identifiers uniquely assigned to respective registered users are set as the user IDs 401. User names of the respective registered users are set as the user names 402. Domain names of the respective registered users are set as the domain names 403. Passwords associated with the respective registered users are set as the passwords 404. E-mail addresses of the respective registered users are set as the e-mail addresses 405. Information as to whether or not the registered users have administrator rights for the MFP 100 is set as the administrator rights 406.

Referring to FIG. 3, first, the CPU 102 displays an authentication screen (not shown) on the touch panel 200 (step S301). The authentication screen has a user name input field, a password input field, and an OK button. When a user enters user information into the input fields and depresses the OK button, the CPU 102 receives the user information (step S302). Next, the CPU 102 compares the user information with the user information DB 400 (step S303). The CPU 102 determines whether or not use permitted user information including the user name 402 and the password 404 matching the user information (hereafter referred to as "matching use permitted user information") is registered in the user information DB 400 (step S304).

As a result of the determination in the step S304, when the matching use permitted user information is not registered in the user information DB 400, the CPU 102 displays an authentication error screen (not shown) on the touch panel 200 (step S305), followed by the process returning to the step S301.

As a result of the determination in the step S304, when the matching use permitted user information is registered in the user information DB 400, the CPU 102 reads out the matching use permitted user information from the user information DB 400 (step S306). Then, the CPU 102 starts a login session (step S307). This enables the user to use the functions of the MFP 100. After that, the CPU 102 ends the present process.

Figure 7A:
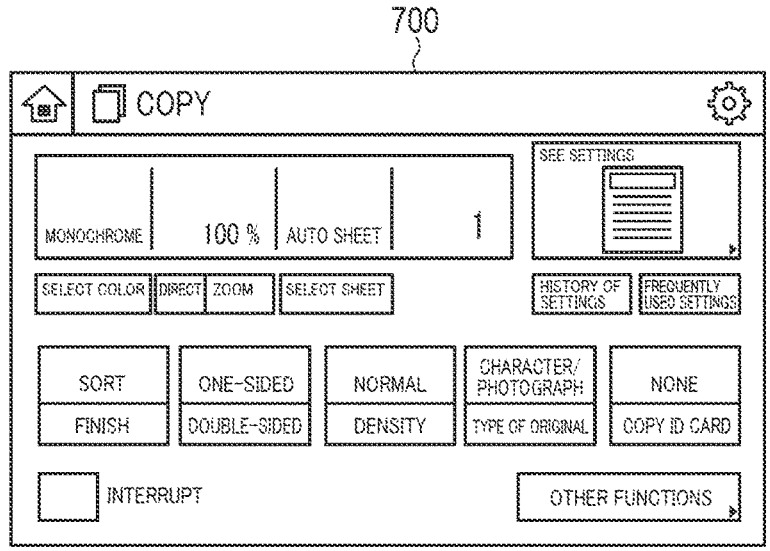
FIGS. 7A to 7C are views showing examples of a copy setting screen which is displayed on the touch panel in FIG. 2.

Applications which are programs of software controlling the installed functions such as a copying application and a saved file using application are stored in the HDD 106 of the MFP 100. The copying application converts image data, which is obtained by the scanner 112 scanning an original, into printing data. The copying application also prints the printing data with the printer 113 based on execution conditions set on a copy setting screen 700 in FIG. 7A, to be described later. The saved file using application converts a file designated by the user into printing data based on execution conditions set on a file selection screen 800 in FIG. 8A and a print setting screen 807 in FIG. 8B, to be described later. The saved file using application also prints the printing data with the printer 113. The user who has logged in the MFP 100 is permitted to operate the home screen 500 in FIG. 5A to set execution conditions for jobs to be executed by the applications.

The home screen 500 is a screen for calling screens on which execution conditions for jobs to be executed by each application are set (hereafter referred to as "application screen"). The home screen 500 has a menu 501, a slide bar 507, and a user name display area 508. App buttons 502 to 504 for the respective applications and custom buttons 505 and 506 (setting call button) are displayed in the menu 501. The menu 501 is comprised of one or more screens. The number of buttons displayed on one screen is determined by a button layout setting (not shown) stored in the HDD 106.

Figure 6:
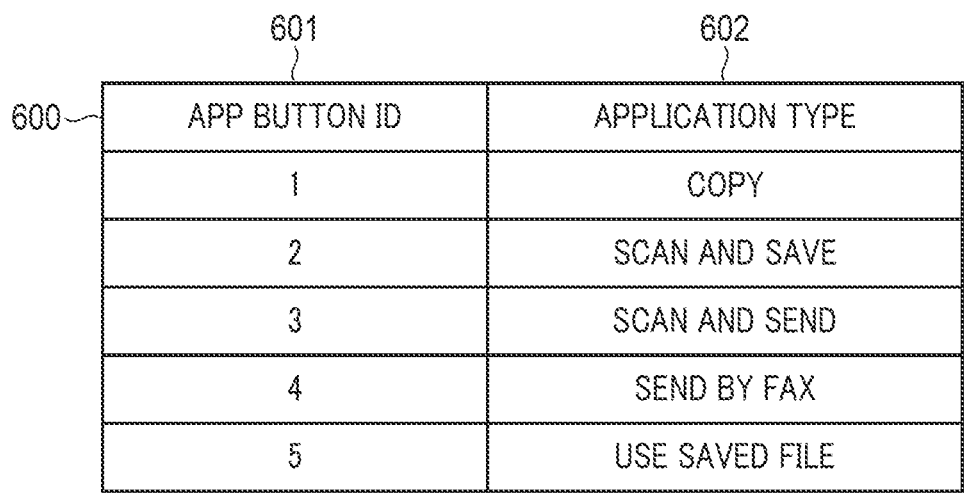
FIG. 6 is a view showing an example of app button information DB which is managed by the MFP in FIG. 1.

The app buttons 502 to 504 are operating buttons for shifting to the corresponding application screens. The MFP 100 manages types of the applications associated with the respective app buttons 502 to 504 by using app button information 600 in FIG. 6. The app button information 600 is stored in the HDD 106 and includes app button IDs 601 and application types 602. IDs uniquely assigned to the respective app buttons 502 to 504 are set as the app button IDs 601. Identifiers indicating types of the applications corresponding to the respective app buttons 502 to 504 are set as the application types 602.

For example, when the user depresses the app button 502 on the home screen 500, the CPU 102 reads out an identifier "copy" corresponding to the app button 502 from the app button information 600. Based on the read identifier "copy", the CPU 102 displays the copy setting screen 700 in FIG. 7A, which is an application screen for the copying application, on the touch panel 200. The copy setting screen 700 is a screen for setting execution conditions for a print job to be executed by the copying application, and more specifically, print setting information. The user is allowed to set a color mode, a sheet size, a magnification, the number of copies, and double-sided printing by operating the copy setting screen 700.

When the user depresses the app button 504 on the home screen 500, the CPU 102 reads out an identifier "use saved file" corresponding to the app button 504 from the app button information 600. Based on the read identifier "use saved file", the CPU 102 displays the file selection screen 800 in FIG. 8A, which is a first application screen for the saved file using application, on the touch panel 200. The file selection screen 800 is a screen for setting data to be printed, which are execution conditions for a print job to be executed by the saved file using application. The file selection screen 800 has a folder path 801, a file list 802, a scroll button 803, a cancel button 804, and a print button 806.

A folder path, which indicates a storage location designated by the user, is displayed as the folder path 801. A list of information on files stored at the storage location indicated by the folder path 801 (hereafter referred to as "file-related information") is displayed as the file list 802. The file-related information is comprised of a file name, a data format of a file, the number of pages in the file, and so forth. By depressing desired file-related information in the file list 802, the user switches files to be selected. A selection is represented by, for example, highlighting a color of a row in which file-related information on a selected file is displayed. In the example in FIG. 8A, "Minutes of Meeting. pdf" in the second row is selected. The scroll button 803 is a button for, when the entire list of file-related information cannot be displayed within one screen, issuing an instruction to display buttons lying off the screen. The cancel button 804 is an operating button for issuing an instruction to cancel a print job to be executed by the saved file using application. The print button 806 is an operating button for issuing an instruction to display the print setting screen 807 in FIG. 8B, which is a second application screen for the saved file using application. The print setting screen 807 is a screen for making print setting information which is execution conditions for a print job executed by the saved file using application. On the print setting screen 807, the user is allowed to set a color mode, a sheet size, a magnification, the number of copies, and double-sided printing. The cancel button 808 is an operating button for issuing an instruction to cancel a print job to be executed by the saved file using application. The print start button 809 is an operating button for issuing an instruction to start a print job using the setting values on the file selection screen 800 and the print setting screen 807.

Referring again to FIG. 5A, the custom buttons 505 and 506 are operating buttons for shifting to application screens set in advance. The application screens are displayed in a state where setting values registered in advance have been set. The custom buttons 505 and 506 are each categorized as either of a My button or a shared button. Only a user who has logged in is allowed to refer to the custom button categorized as the My button. All users are allowed to refer to the custom button categorized as the shared button. In the MFP 100, new custom buttons are registered by carrying out a custom button registration process in FIG. 9, to be described later.

The slide bar 507 switches pages of the menu 501. It should be noted that in the present embodiment, pages of the menu 501 are not always switched in this way, but for example, pages of the menu 501 may be switched when a flick operation is detected on the touch panel 200. In response to notification of a page switching instruction from the operating unit 111, the CPU 102 reads out information on buttons displayed on pages after page switching from the HDD 106 or the RAM 105 and carries out a process to switch pages of the menu 501.

A name of a user who is currently logged in the MFP 100 is displayed in the user name display area 508. The CPU 102 reads out the name of the user who is currently logged in the MFP 100 from the user information DB 400 and displays it on the touch panel 200. When a login session is not valid, a character string, an icon, or the like indicating that no one is logged in the MFP 100 is displayed, and for example, a fixed mark such as "-------" is displayed.

Figure 7B:
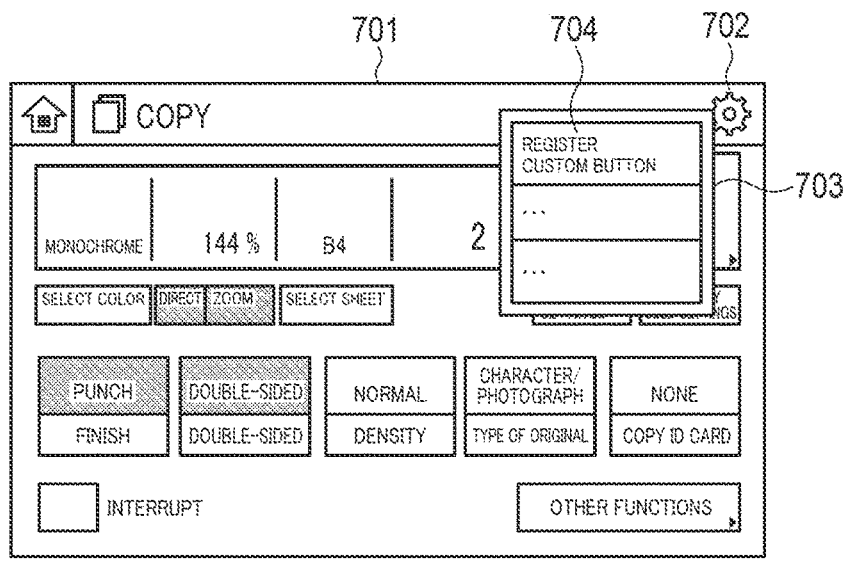
Figure 9:
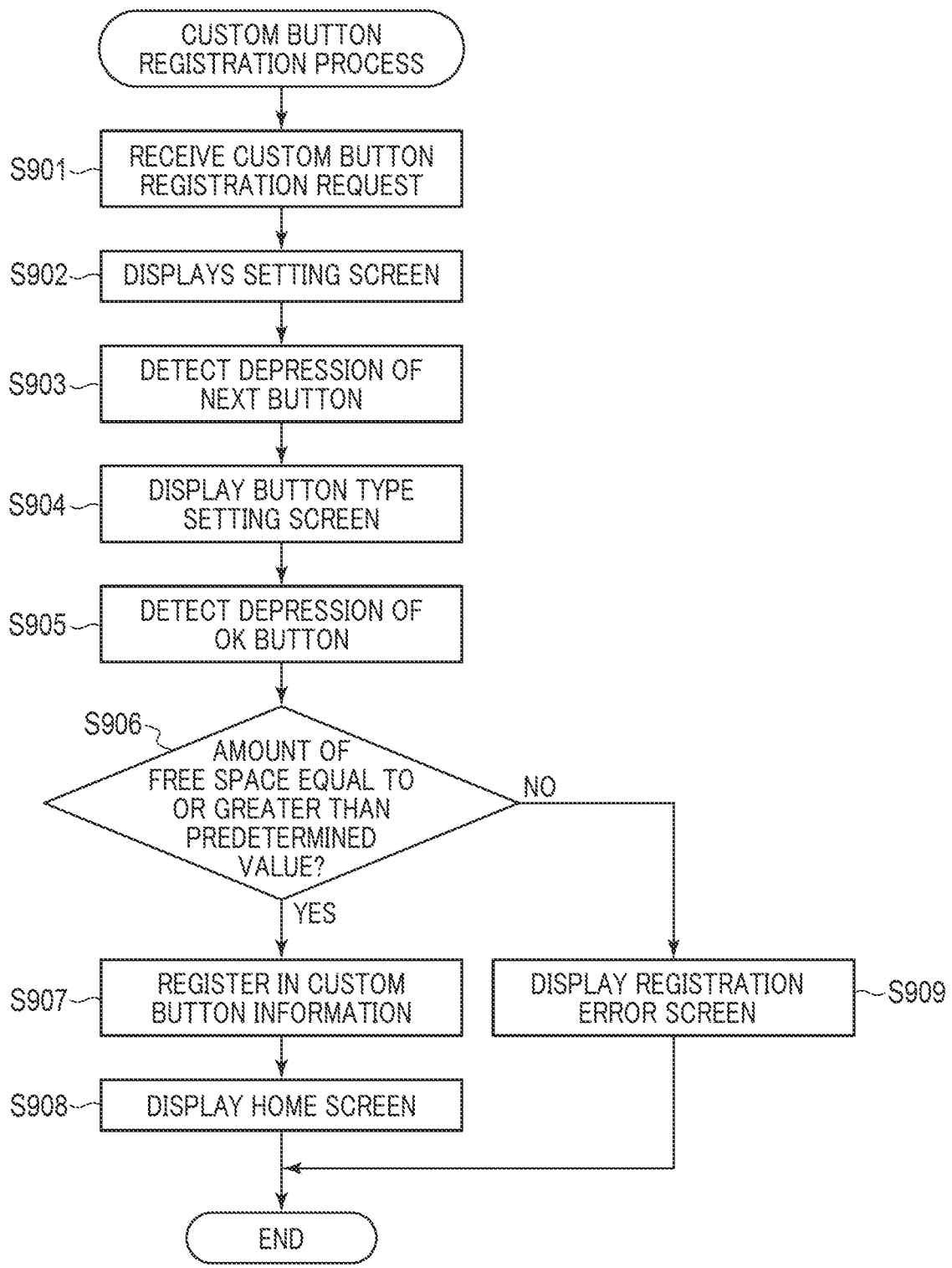
FIG. 9 is a flowchart showing the procedure of a custom button registration process which is carried out by the MFP in FIG. 1.

FIG. 9 is a flowchart showing the procedure of the custom button registration process which is carried out by the MFP 100 in FIG. 1. The process in FIG. 9 is implemented by the CPU 102 executing programs in the ROM 107 or the like. The process in FIG. 9 is based on the assumption that, for example, a request to register a custom button for predetermined print setting information has been issued by the user on a copy setting screen 701 in FIG. 7B. In this example, the predetermined print setting information is comprised of a color mode "monochrome", sheet size "B4", finishing "punching", a magnification "144%", the number of copies "2", and "double-sided printing". When the user depresses a setting button 702 in FIG. 7B on the copy setting screen 701, the CPU 102 displays a setting menu 703 on the copy setting screen 701. The user depresses a registration button 704 in the setting menu 703 to make a custom button registration request.

Figure 10:
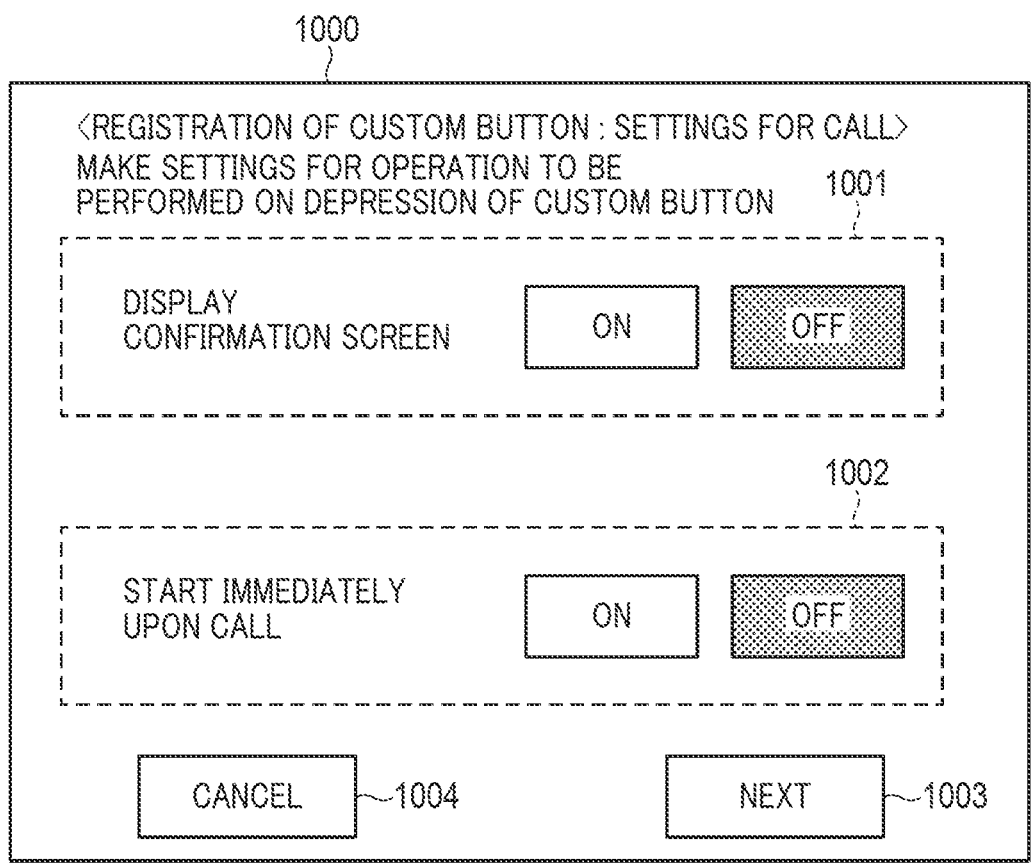
FIG. 10 is a view showing an example of a setting screen which is displayed on the touch panel in FIG. 2.

Upon receiving the custom button registration request (step S901), the CPU 102 displays a setting screen 1000 in FIG. 10 on the touch panel 200 (step S902). The setting screen 1000 has a confirmation screen display setting 1001, an immediate execution setting 1002, a next button 1003, and a cancel button 1004. As the confirmation screen display setting 1001, the user sets on-off information indicating whether or not to display a setting confirmation screen (not shown), to be described later, when a registered custom button is depressed. As the immediate execution setting 1002, the user sets on-off information indicating whether or not to immediately execute a job based on setting values associated with a registered custom button when the custom button is depressed. When the cancel button 1004 is depressed, the CPU 102 ends the present process.

Figure 11:
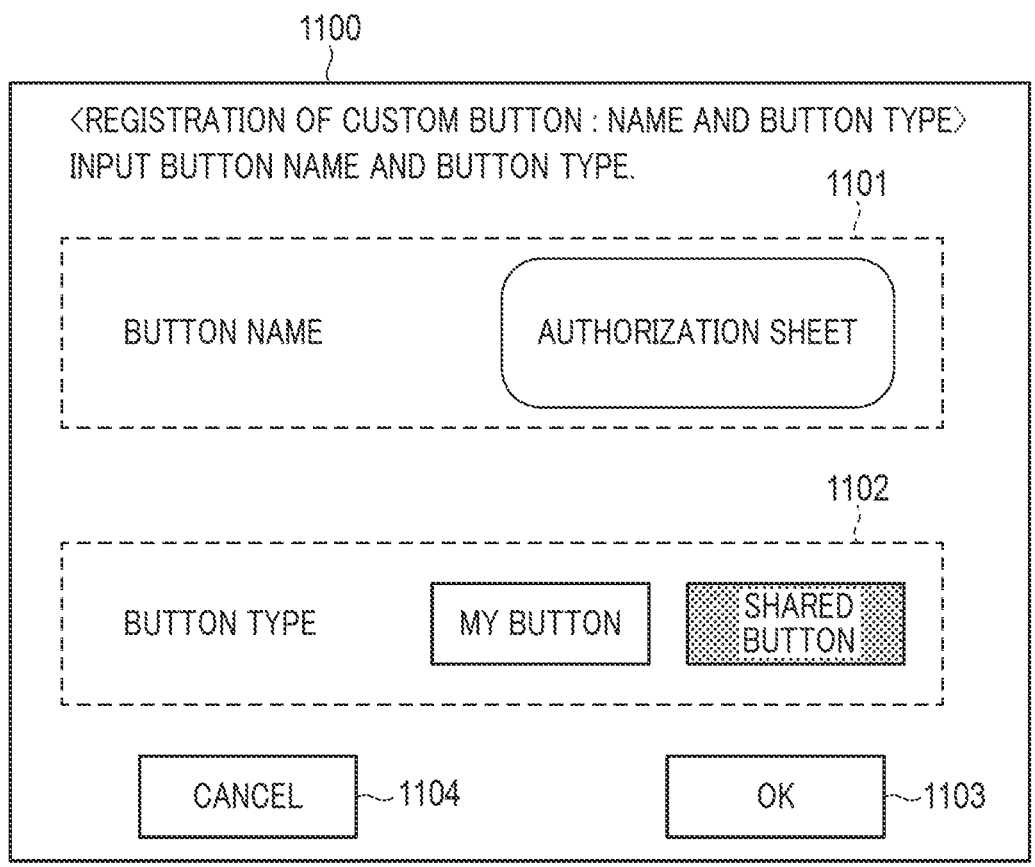
FIG. 11 is a view showing an example of a button type setting screen which is displayed on the touch panel in FIG. 2.

Upon detecting depression of the next button 1003 (step S903), the CPU 102 displays a button type setting screen 1100 in FIG. 11 on the touch panel 200 (step S904). The button type setting screen 1100, which is a screen for setting a name and type of a custom button, has a button name 1101, a button type 1102, an OK button 1103, and a cancel button 1104. As the button name 1101, a name of the custom button to be registered is input by the user. The user inputs, as the name of the custom button, a character string which is suggestive of a setting value for the custom button to be registered, for example, a name of a file to be printed and an absolute path indicating a storage location of the file, or a specific value of a setting for the custom button. As the button type 1102, either of the My button and the shared button is selected by the user as a type of the custom button. When the cancel button 1104 is depressed, the CPU 102 ends the present process. Upon detecting depression of the OK button 1103 (step S905), the CPU 102 determines whether or not the amount of a free space in the HDD 106 is equal to or greater than a predetermined value (step S906).

As a result of the determination in the step S906, when the amount of free space in the HDD 106 is equal to or greater than the predetermined value, the CPU 102 registers the custom button. Specifically, the CPU 102 registers the setting values set on the copy setting screen 701, the setting screen 1000, and the button type setting screen 1100 as custom button information 1200 in FIG. 12 (step S907). The custom button information 1200 is stored in the HDD 106 and manages information related to registered custom buttons. The custom button information 1200 includes a custom button ID 1201, a button type 1202, an owner user ID 1203, a button name 1204 (character string), an application type 125, an update date 1206, application data 1207, a confirmation setting 1208, and an immediate execution setting 1209. It should be noted that the components of the custom button information 1200 are examples, and the custom button information 1200 may have other items as well as the above described items.

As the custom button ID 1201, an ID uniquely assigned to the registered custom button is set. As the button type 1202, a setting value set as the button type 1102, and more specifically, either of the shared button and the My button is set. When the button type 1202 is the My button, a user ID for identifying the user who has made the request to register the custom button is set as the owner user ID 1203. The setting value set as the button name 1101 is set as the button name 1204. As the application type 1205, an identifier indicating a type of an application corresponding to the registered custom button is set. As the update date 1206, a registration date and time or update date and time for the custom button is set. As the application data 1207, the setting values set on the copy setting screen 701 are set using Hash Map i.e. "KEY/VALUE". The setting value set as the confirmation screen display setting 1001 is set as the confirmation setting 1208. The setting value set as the immediate execution setting 1002 is set as the immediate execution setting 1209. In the step S907, custom button-related information 1301 in FIG. 13 is registered as the custom button information 1200.

Figure 5B:
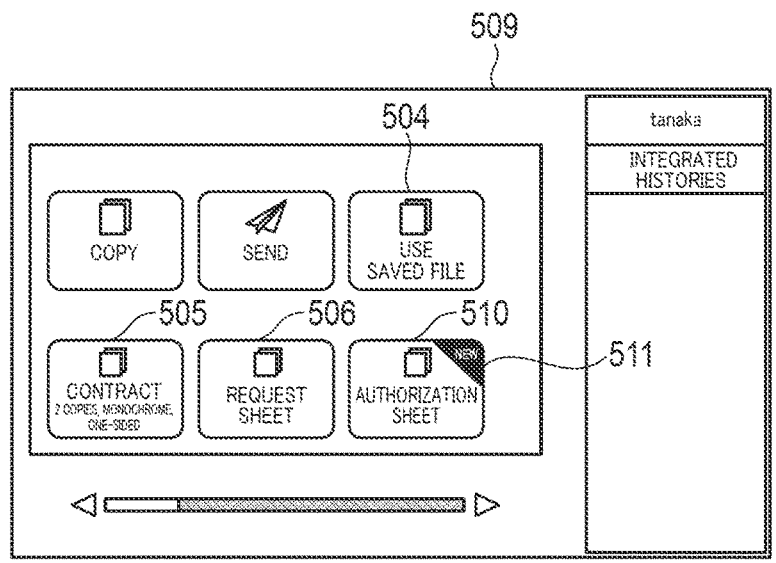

Next, the CPU 102 displays a home screen 509 in FIG. 5B on the touch panel 200 (step S908). On the home screen 509, a custom button 510 corresponding to the custom button-related information 1301 is displayed in addition to the custom button 505 and 506. A NEW icon 511 indicating a new registration is displayed on the custom button 510. The NEW icon 511 is hidden with arbitrary timing such as login, logout, auto clear, sleep, shutdown, or depression of the custom button 501. After that, the CPU 102 ends the present process.

As a result of the determination in the step S906, when the amount of free space in the HDD 106 is less than the predetermined value, the CPU 102 displays a registration error screen (not shown) on the touch panel 200 (step S909) and ends the present process.

Figure 14:
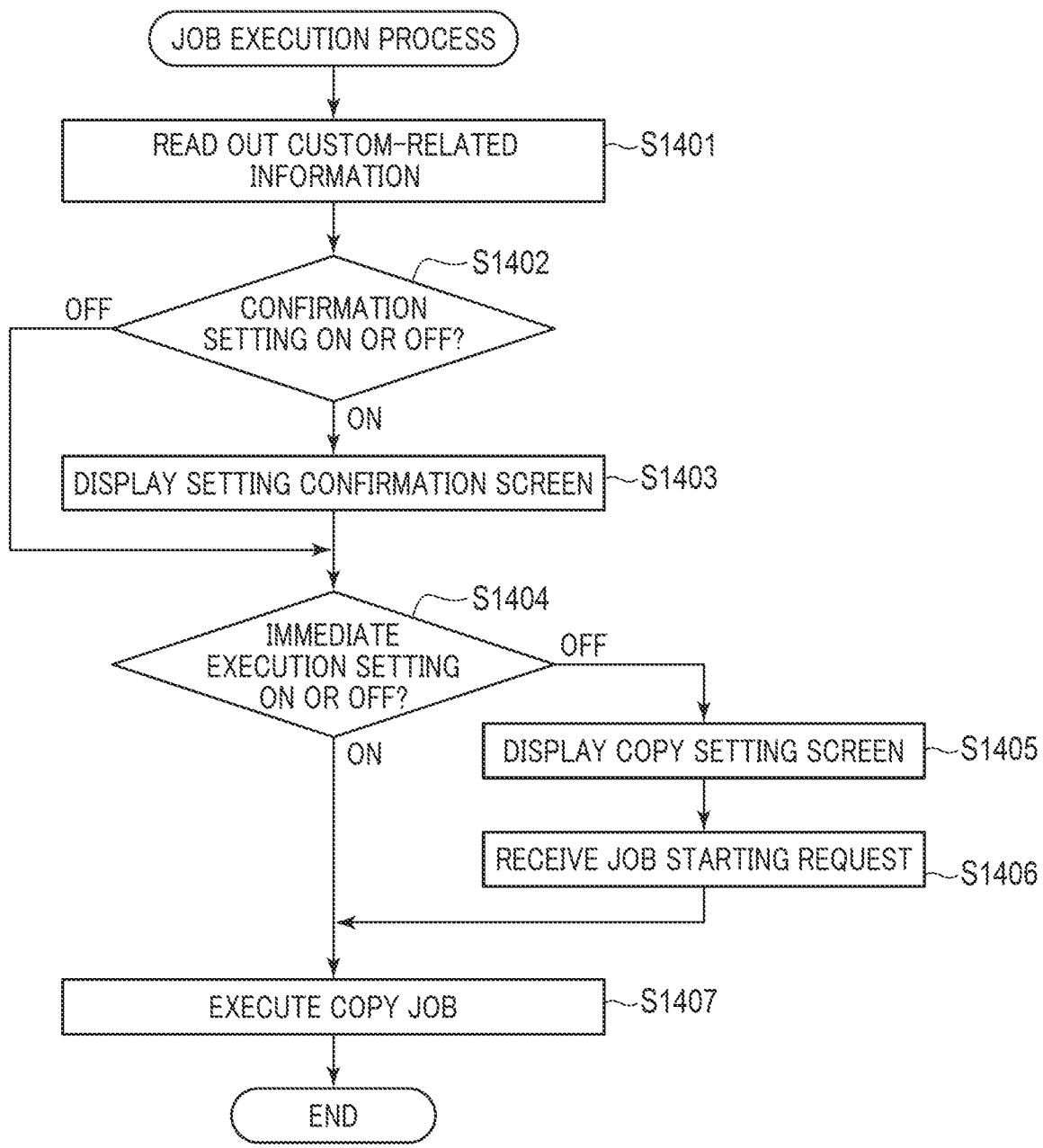
FIG. 14 is a flowchart showing the procedure of a job execution process which is carried out by the MFP in FIG. 1.

FIG. 14 is a flowchart showing the procedure of a job execution process which is carried out by the MFP 100 in FIG. 1. The process in FIG. 14 is implemented by the CPU 102 executing programs in the HDD 106. The process in FIG. 14 is carried out when the user has depressed any of the custom buttons 505, 506, and 510 on the home screen 509.

Referring to FIG. 14, first, the CPU 102 reads out custom button-related information corresponding to the depressed custom button from the custom button information 1200 (step S1401). For example, when the user has depressed the custom button 505, the CPU 102 reads out custom button-related information 1501 in FIG. 15 corresponding to the custom button 505 from the custom button information 1200. Next, the CPU 102 determines whether a setting value of the confirmation setting 1208 in the custom button-related information 1501 is "ON" or "OFF" (step S1402).

As a result of the determination in the step S1402, when the setting value of the confirmation setting 1208 is "OFF", the CPU 102 carries out a process in step S1404, to be described later. As a result of the determination in the step S1402, when the setting value of the confirmation setting 1208 is "ON", the CPU 102 displays a setting confirmation screen (not shown) on the touch panel 200 (step S1403). The setting confirmation screen includes a message asking whether or not to call the custom button-related information 1501. Then, the CPU 102 determines whether or not a setting value of the immediate execution setting 1209 in the custom button-related information 1501 is "ON" or "OFF" (step S1404).

Figure 7C:
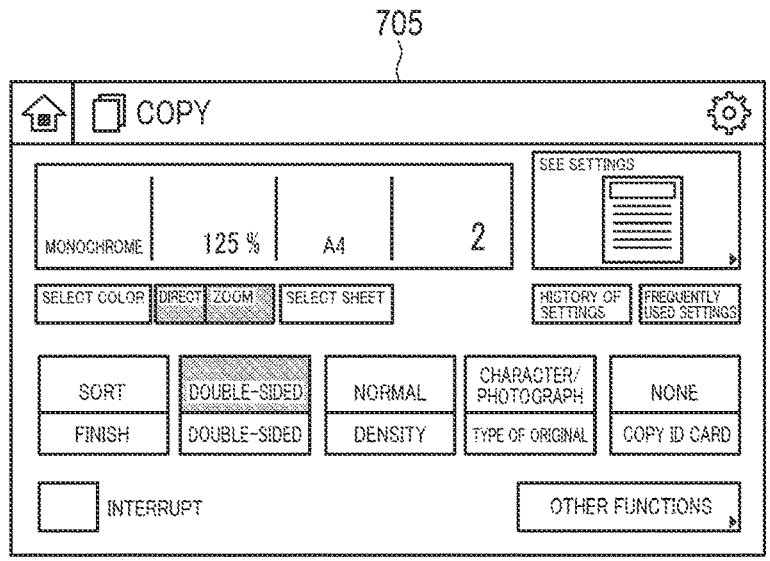

As a result of the determination in the step S1404, when the setting value of the immediate execution setting 1209 is "OFF", the CPU 102 displays a copy setting screen 705 in FIG. 7C on the touch panel 200 (step S1405). The setting values of the application data 1207 in the custom button-related information 1501 are set in respective setting fields of the copy setting screen 705. Then, upon detecting depression of the start key 201 by the user and receiving a job starting request (step S1406), the CPU 102 executes a copy job based on the print setting information configured on the copy setting screen 705 (step S1407). While the copy job is being executed, an in-execution screen (not shown) is displayed on the touch panel 200. After that, the CPU 102 ends the present process.

As a result of the determination in the step S1404, when the setting value of the immediate execution setting 1209 is "ON", the CPU 102 carries out the processes in the step S1407 and the subsequent steps without displaying the copy setting screen 705 on the touch panel 200.

As described above, the MFP 100 enables the user to easily issue an instruction to execute a print job by using the custom button registration function, but the user needs to perform the custom button registration function described above, which takes a lot of time and effort. To save the time and effort, for example, a reprint function of performing printing the same file using the same settings, and more specifically, print setting information based on setting histories of print jobs executed in the past is used. With the reprint function, the user can easily issue an instruction to execute a job based on execution conditions set in the past without performing the custom button registration function described above.

Figure 8A:
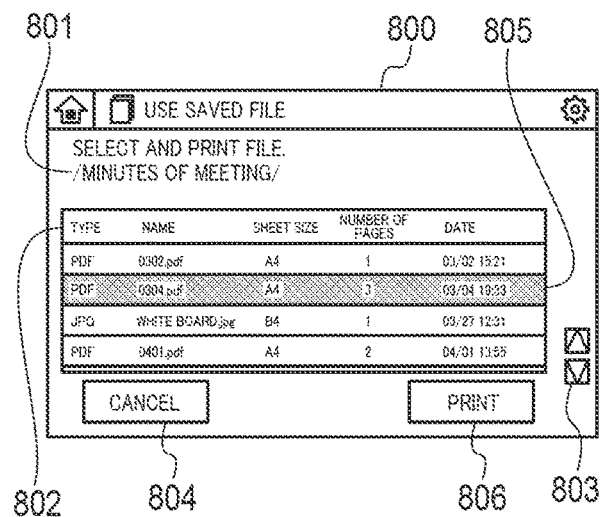
FIGS. 8A to 8D are views showing examples of an application screen which is displayed on the touch panel in FIG. 2.
Figure 8B:
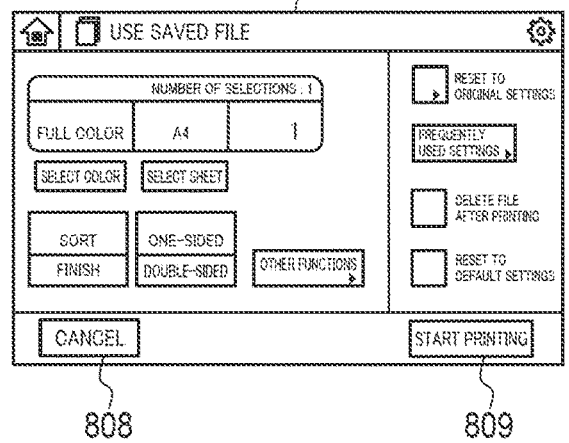
Figure 16:
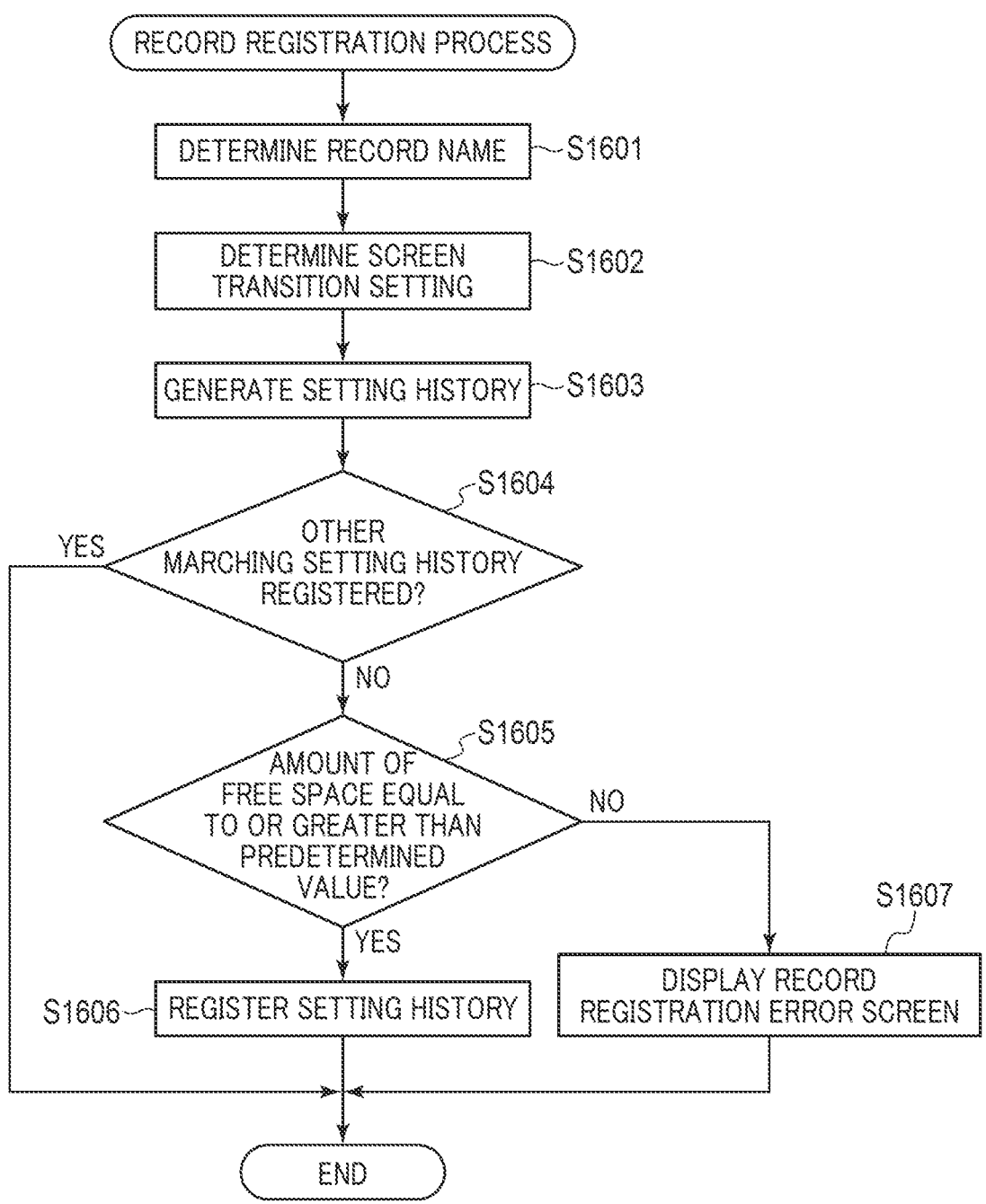
FIG. 16 is a flowchart showing the procedure of a record registration process which is carried out by the MFP in FIG. 1.

FIG. 16 is a flowchart showing the procedure of a record registration process which is carried out by the MFP 100 in FIG. 1. The process in FIG. 16 is implemented by the CPU 102 executing programs in the ROM 107 or the like. The process in FIG. 16 is carried out when, for example, a job executing instruction issued by the user is received. The process in FIG. 16 is based on the assumption that, for example, an instruction to execute a print job using the saved file using application for which the execution conditions in FIGS. 8A and 8B are set has been received.

Referring to FIG. 16, first, the CPU 102 determines a record name (step S1601). The record name is represented by a character string or an icon so that the user can easily recognize what is included in a record. For example, a file name is represented by an absolute path that identifies a storage location, and setting values of main setting items among print setting information are represented by character strings or icons. The main setting items include, for example, print settings items such as a color mode, double-sided printing, finishing, and the number of copies. The record name may also be a setting value changed from a factory default setting value through operation by the user.

Figure 17:
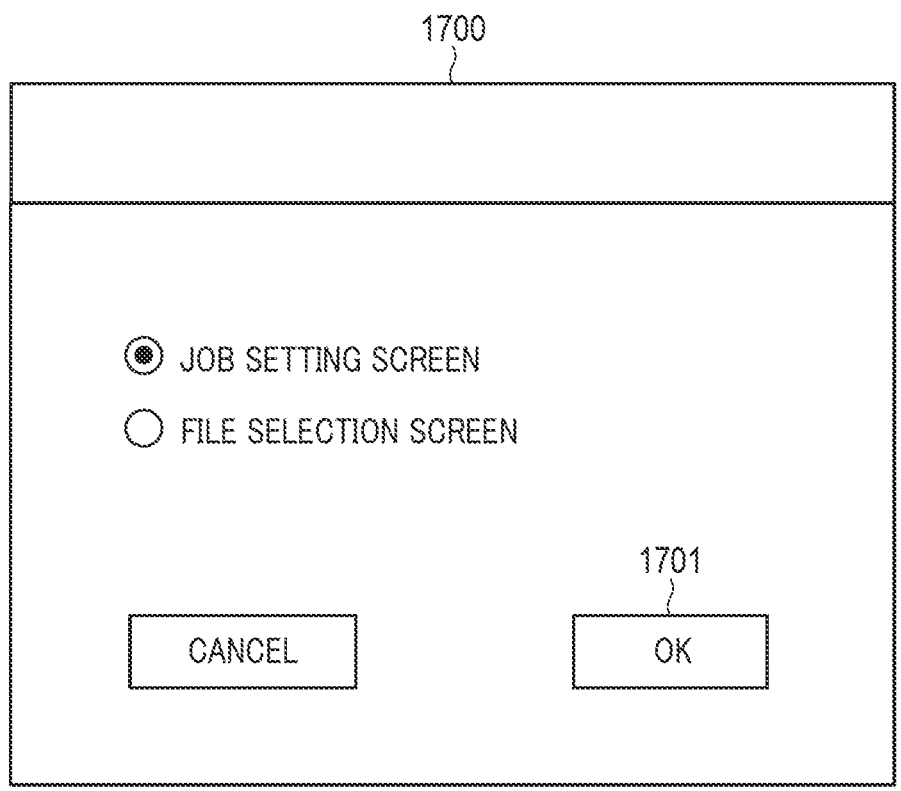
FIG. 17 is a view showing an example of a selection screen which is displayed on the touch panel in FIG. 2.

Next, the CPU 102 displays a selection screen 1700 in FIG. 17 on the touch panel 200. On the selection screen 1700, information that identifies an application screen to be displayed when the user selects a record with which the above execution conditions are associated is set. Specifically, on the selection screen 1700, the user selects either of a job setting screen and a file selection screen. When the job setting screen is selected, an application screen for setting print setting information on the print setting screen 807 or the like is displayed on the touch panel 200 when the user depresses a record with which the above execution conditions are associated. When the file selection screen is selected, an application screen for setting data to be printed on the file selection screen 800 or the like is displayed on the touch panel 200 when the user depresses a record with which the above execution conditions are associated.

Upon detecting depression of an OK button 1701 by the user, the CPU 102 determines a screen transition setting based on the setting value on the selection screen 1700 (step S1602). The setting value on the selection screen 1700 may be used as either a setting value unique to the user or a setting value common to the MFP 100.

Then, the CPU 102 issues a new record ID so as to register the record associated with the above execution conditions in record information 1800 in FIG. 18 in which information on records is managed. The record information 1800 is stored in the HDD 106. The record information 1800 includes a record ID 1801, a record type 1802, an owner user ID 1803, a record name 1804 (character string), an application type 1805, an update date 1806, application data 1807, and a screen transition setting 1808 (identifying information). The components of the record information 1800 are examples, and the record information 1800 may include other items as well as the above described items, for example, items similar to the confirmation setting 1208 and the immediate execution setting 1209 in the custom button information 1200. The number of items in the record information 1800 may vary with application types.

As the record ID 1801, an ID uniquely assigned to the record is set. As the record type 1802, either of a shared record and my record is set. When the record type 1802 is the my record, a user ID for identifying the user who has set the execution conditions for the record is set as the owner user ID 1803. As the record name 1804, the record name determined in the process in the step S1601 is set. As the application type 1805, an identifier indicating a type of an application corresponding to the record is set. As the update date 1806, a registration date and time for the record is set. As the application data 1807, the job setting values are set using Hash Map i.e. "KEY/VALUE". For example, as the application data 1807, a folder path indicating a storage location for print setting information and data to be printed is set. As the screen transition setting 1808, the screen transition setting made in the process in the step S1602 is set.

After that, the CPU 102 generates a setting history 1900 in FIG. 19 based on the issued record ID, the result of the process in the step S1601, the above execution conditions, and the setting values on the selection screen 1700 (step S1603) and reads out the record information 1800. The CPU 102 then compares the setting history 1900 and the record information 1800 with each other. The CPU 102 determines whether or not another setting history including the application data 1807 matching the setting history 1900 is registered in the record information 1800 (step S1604).

As a result of the determination in the step S1604, when the other setting history is not registered in the record information 1800, the CPU 102 determines whether or not the amount of free space in the HDD 106 is equal to or greater than a predetermined value (step S1605).

As a result of the determination in the step S1605, when the amount of free space in the HDD 106 is equal to or greater than the predetermined value, the CPU 102 registers the setting history 1900 in the record information 1800 (step S1606) and ends the present process.

As a result of the determination in the step S1605, when the amount of free space in the HDD 106 is less than the predetermined value, the CPU 102 displays a record registration error screen (not shown) on the touch panel 200 (step S1607) and ends the present process.

As a result of the determination in the step S1604, when the other setting history is registered in the record information 1800, the CPU 102 ends the present process without registering the setting history 1900 in the record information 1800.

Thus, an executing instruction for an executed print job is managed as a record in the MFP 100 without the need to perform the above described custom button registration operation.

Figure 20:
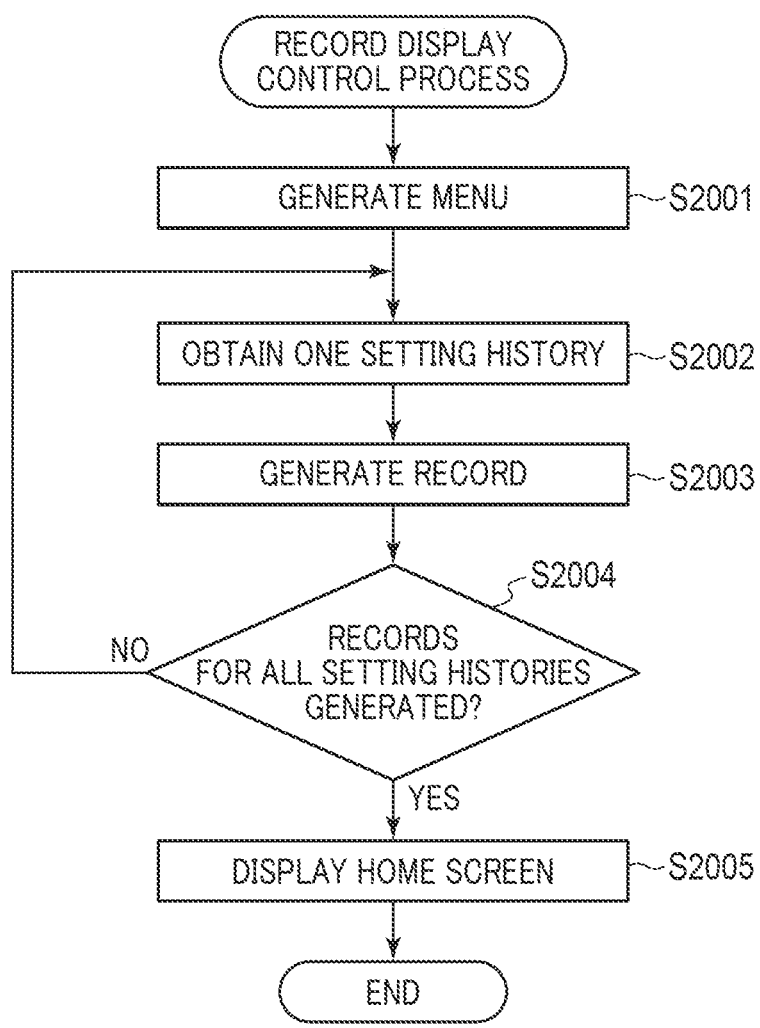
FIG. 20 is a flowchart showing the procedure of a record display control process which is carried out by the MFP in FIG. 1.

FIG. 20 is a flowchart showing the procedure of a record display control process which is carried out by the MFP 100 in FIG. 1.

The process in FIG. 20 is implemented by the CPU 102 executing programs in the HDD 106. The process in FIG. 20 is carried out when a login session has been started by the authentication process in FIG. 3.

Referring to FIG. 20, first, the CPU 102 generates the menu 501 based on the app button information 600 and the custom button information 1200 (step S2001). Next, the CPU 102 obtains one setting history from the record information 1800 (step S2002), and based on the obtained setting history, generates a record that is to be displayed on the home screen 500 (step S2003). Then, the CPU 102 determines whether or not records for all of setting histories registered in the record information 1800 have been generated (step S2004).

As a result of the determination in the step S2004, when a record for any of the setting histories registered in the record information 1800 has not been generated, the process returns to the step S2002.

Figure 5C:
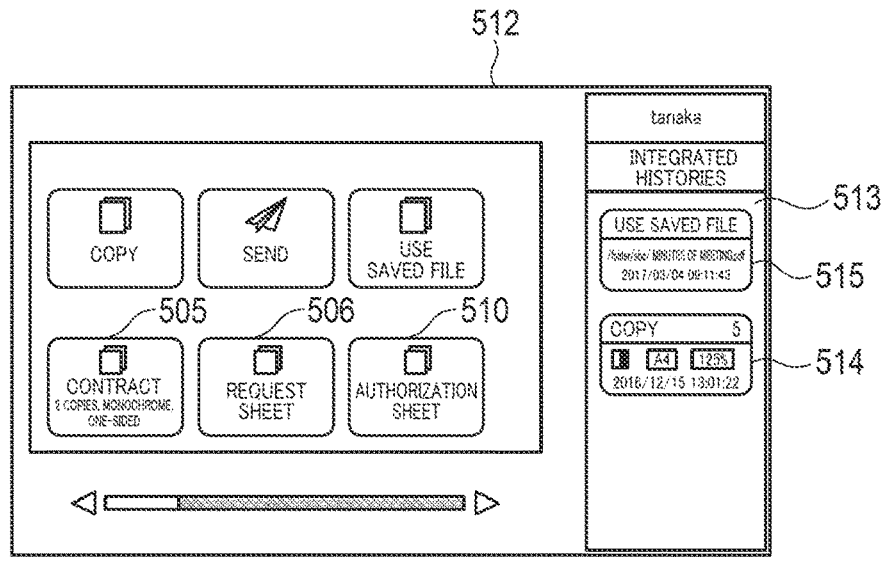

As a result of the determination in the step S2004, when records for all of the setting histories registered in the record information 1800 have been generated, the CPU 102 displays a home screen 512 in FIG. 5C on the touch panel 200 (step S2005). The menu 501 generated by the process in the step S2001 is displayed on the home screen 512. In a timeline 513 on the home screen 512, records 514 and 515 (history buttons) generated by the process in the step S2003 are displayed. In the present embodiment, when a job is executed, a record with which execution conditions for the job are associated is placed at the top in the timeline 513. When the number of records has increased to such an extent as not to fit in the timeline 513, a scroll bar (not shown) is displayed in the timeline 513. The user uses the scroll bar to display records extending off the timeline 513. When the number of records has reached a predetermined number, the records are deleted in order from the oldest one. After that, the CPU 102 ends the present process.

Figure 21:
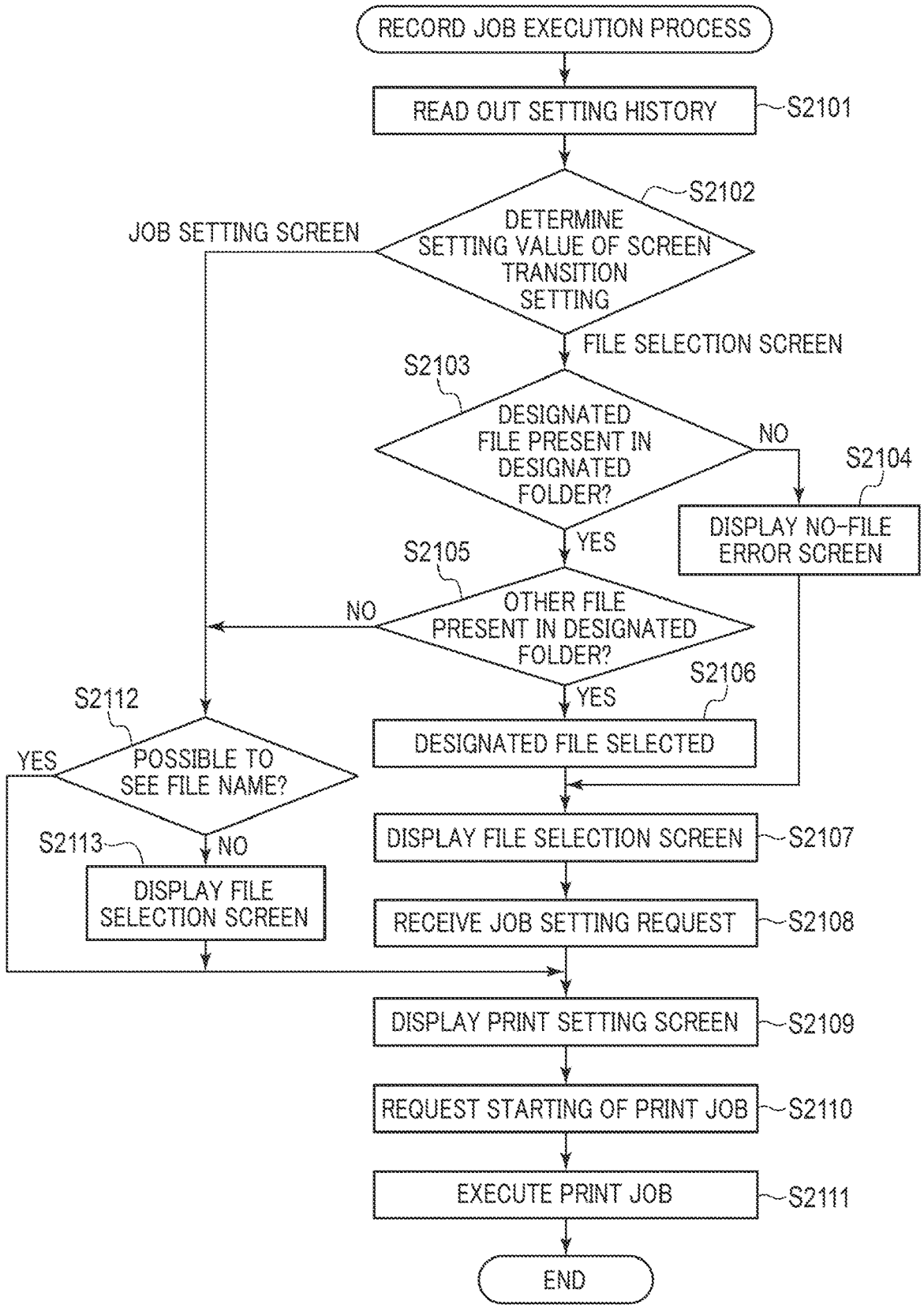
FIG. 21 is a flowchart showing the procedure of a record job execution process which is carried out by the MFP in FIG. 1.

FIG. 21 is a flowchart showing the procedure of a record job execution process which is carried out by the MFP 100 in FIG. 1. The process in FIG. 21 is implemented by the CPU 102 executing programs in the HDD 106. The process in FIG. 21 is carried out when the user has depressed a record displayed in the timeline 513.

Here, in the MFP 100, a part of a record name determined by the process in the step S1601 is not displayed in a record sometimes. For example, when an absolute path is used as the record name, the record name may not fit into a name display area of the record like a record 2201 in FIG. 22, and a part of the record name is omitted sometimes. When such a record is displayed in the timeline 513, the user cannot see a file to be printed in the record. Also, when the setting value of the screen transition setting 1808 in a setting history corresponding to the record is not "file selection screen", the user is allowed to issue an instruction to print a file associated with the record without designating a file to be printed. Namely, when an instruction to perform printing is issued based on a record in which a part of a record name is not displayed, the user cannot see a file to be printed, and hence a file different from a desired file is printed against user's will.

To cope with this problem, in the present embodiment, when the user selects a record in which at least a part of a character string of the record name 1804 is not displayed, a file name confirmation screen 2400 (notification screen) in FIG. 24, to be described later, is displayed.

Referring to FIG. 21, first, the CPU 102 reads out a setting history corresponding to the depressed record from the record information 1800 (step S2101). For example, when the user has depressed the record 515, the CPU 102 reads out a setting history 2301 in FIG. 23 corresponding to the record 515 from the record information 1800. Next, the CPU 102 determines a setting value of the screen transition setting 1808 in the setting history 2301 (step S2102).

In the step S2102, when the setting value of the screen transition setting 1808 is "file selection screen", the CPU 102 obtains a folder path and a file name from the application data 1807 in the setting history 2301. Then, the CPU 102 determines whether or not a file with the above file name (hereafter referred to as "the designated file") is present in a designated folder indicated by the above folder path (step S2103).

As a result of the determination in the step S2103, when the designated file is not present in the designated folder, the CPU 102 displays a no file error screen (not shown) on the touch panel 200 (step S2104) and carries out a process in step S2107.

As a result of the determination in the step S2103, when the designated file is present in the designated folder, the CPU 102 determines whether or a file other than the designated file is present in the designated folder (step S2105).

Figure 8C:
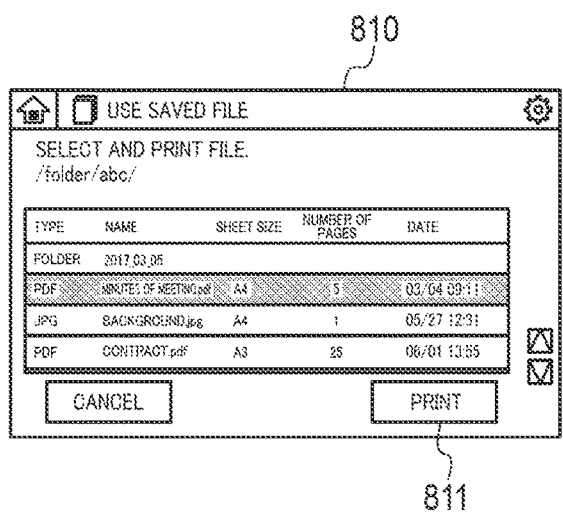
Figure 8D:
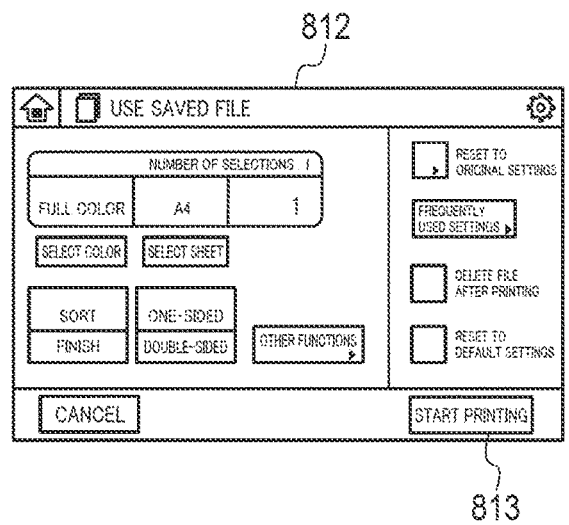

As a result of the determination in the step S2105, when a file other than the designated file is present in the designated folder, the CPU 102 displays on the touch panel 200 a file selection screen 810 in FIG. 8c with the designated file in the selected state (steps S2106, S2107). This enables the user to easily select another file stored in the designated folder by operating the file selection screen 810. Then, the CPU 102 detects depression of a print button 811 on the file selection screen 810 by the user and receives a job setting request (step S2108). After that, the CPU 102 displays a print setting screen 812 in FIG. 8D on the touch panel 200 (step S2109). The print setting screen 812 is displayed in a state where the setting values of the application data 1807 in the setting history 2301 have been set.

The CPU 102 then detects depression of a print start button 813 by the user, and upon receiving a request to execute a print job (step S2110), executes the print job (step S2111). The print job is executed based on the setting values on the file selection screen 810 and the print setting screen 812. While the print job is being executed, an in-execution screen (not shown) is displayed on the touch panel 200. After that, the CPU 102 ends the present process.

In the step S2102, when the setting value of the screen transition setting 1808 is "job setting screen", or as a result of the determination in the step S2105, when no file other than the designated file is present in the designated folder, that is, only the designated file is present in the designated folder, the CPU 102 determines whether or not the user can identify a file name from the selected record (step S2112). Specifically, the CPU 102 determines whether or not all of a character string set as the record name 1804 of a setting history that has been read out is displayed in the selected record. In the step S2112, when all of a character string set as the record name 1804 is displayed like, for example, the record 515, the CPU 102 determines that the user can identify a file name from the selected record. On the other hand, when at least a part of a character string set as the record name 1804 is not displayed like, for example, the record 2201, the CPU 102 determines that the user cannot identify a file name from the selected record.

As a result of the determination in the step S2112, when the user can identify a file name from the selected record, the CPU 102 carries out the processes in the step S2109 and the subsequent steps.

Figure 24:
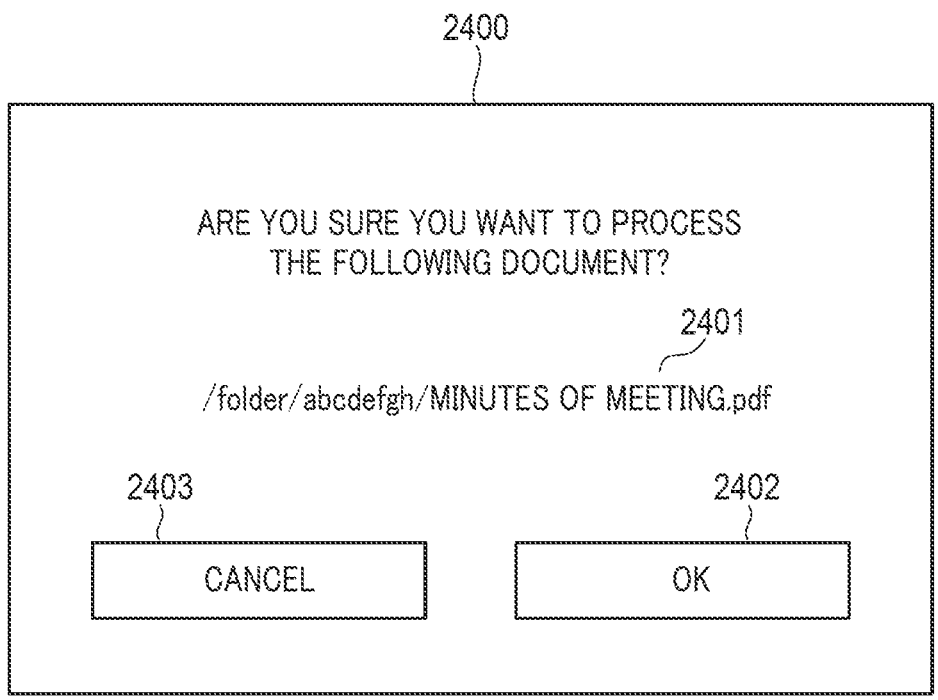
FIG. 24 is a view showing examples of a file name confirmation screen which is displayed on the touch panel in FIG. 2.

As a result of the determination in the step S2112, when the user cannot identify a file name from the selected record, the CPU 102 displays the file name confirmation screen 2400 in FIG. 24 on the touch panel 200 (step S2113). The file name confirmation screen 2400 is for the user to confirm a file to be printed. The file name confirmation screen 2400 includes an absolute path 2401, an OK button 2402, and a cancel button 2403. As the absolute path 2401, an absolute path that can identify a name and a storage location of a file associated with the selected record is displayed based on the folder path and the file name in the application data 1807 of the setting history that has been read out. When the user depresses the OK button 2402 on the file name confirmation screen 2400, the CPU 102 carries out the processes in the step S2109 and the subsequent steps. On the other hand, when the user depresses the cancel button 2403 on the file name confirmation screen 2400, the CPU 102 switches the display on the touch panel 200 to the home screen 512 and ends the present process.

According to the embodiment described above, the file name confirmation screen 2400 is displayed when the user has selected a record in which at least a part of a character string set as the record name 1804 is not displayed. This notifies the user of a file to be printed when he or she gives an instruction to perform printing using the record and thus prevents printing u from being performed against user's will based on the record displayed in the timeline 513.

Moreover, in the embodiment described above, the file name confirmation screen 2400 includes an absolute path indicating a name of a file to be printed and a storage location of the file. This enables the user to easily recognize a name of a file to be printed and a storage location of the file.

Furthermore, in the embodiment described above, when the user has selected a record in which at least a part of a character string set as the record name 1804 is not displayed, the file name confirmation screen 2400 is displayed before the print setting screen 812 is displayed. This prevents printing from being started using the print setting screen 812 without the user confirming a file to be printed.

It should be noted that the file name confirmation screen 2400 may be displayed as a pop-up screen in such a manner as to cover at least a part of the print setting screen 812 displayed when the user has selected a record in which at least a part of a character string set as the record name 1804 is not displayed.

Furthermore, in the embodiment described above, a target button is not limited to a record displayed in the timeline 513 but may be, for example, the custom button 505 or 506 displayed on the home screen 500. When the user has selected a custom button in which at least a part of a character string set as the button name 1204 in the custom button-related information is not displayed, the file name confirmation screen 2400 is displayed. This obtains the same effects as those obtained in the embodiment described above.

Figure 22:
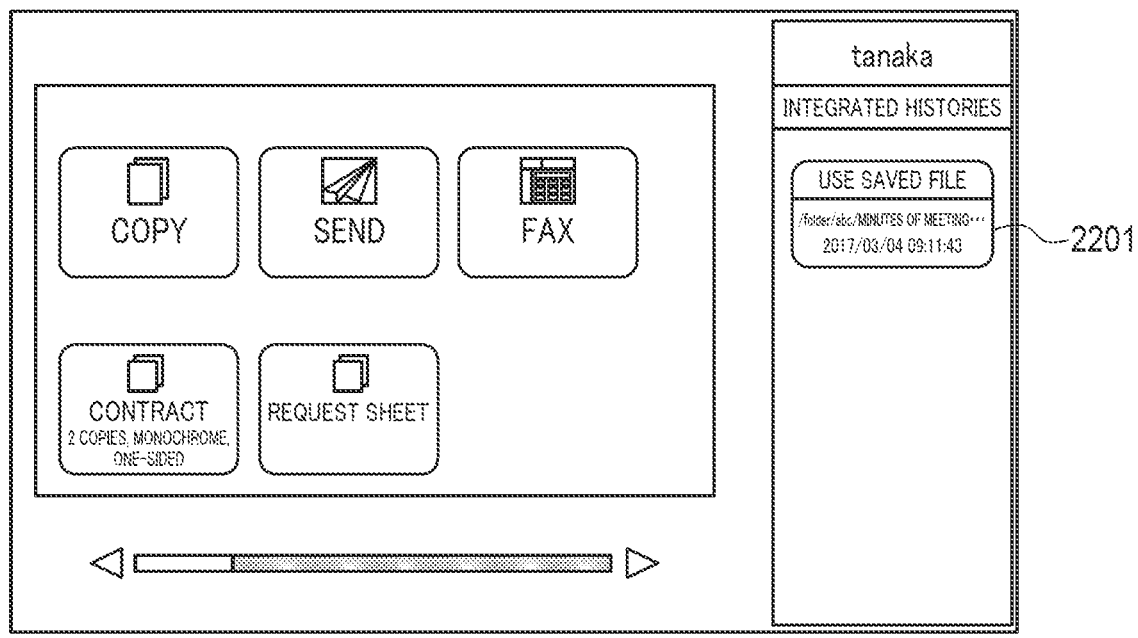
FIG. 22 is a view showing an example of a home screen which is displayed on the touch panel in FIG. 2.

In the embodiment described above, the determination in the step S2112 may be made based on whether or not an ellipsis is used as shown in FIG. 22. For example, when an ellipsis such as " . . . " is not used in the selected record, the CPU 102 determines that the user can identify a file name from the selected record. On the other hand, when an ellipsis such as " . . . " is used in the selected record, the CPU 102 determines that the user cannot identify a file name from the selected record.

Moreover, in the embodiment described above, the determination in the step S2112 may be made based on whether or not the number of characters is greater than a predetermined number set in advance. For example, when the number of characters in a character string set as the record name 1804 of a setting history that has been read is equal to or smaller than the predetermined number, the CPU 102 determines that the user can identify a file name from the selected record. On the other hand, when the number of characters in a character string set as the record name 1804 of a setting history that has been read is greater than the predetermined number, the CPU 102 determines that the user cannot identify a file name from the selected record.

In the embodiment described above, the record 514 or 515 on which the user has performed a predetermined operation may be registered as a custom button. When, for example, the user holds down the record 515 in the timeline 513, a popup menu (not shown) for receiving an instruction to register the record 515 as a custom button is displayed on the touch panel 200. Upon receiving the registration instruction via the popup menu, the CPU 102 generates a custom button for calling the setting history of the record 515. Thus, a setting history not desired to be deleted is easily left, and hence the setting history can be called with desired timing.

Moreover, in the embodiment described above, the authentication method is not limited to the authentication method used in the process in FIG. 3, but the MFP 100 may be connected to an external authentication server via the communication unit 103, and a result of authentication using the external authentication server may be used.

In the embodiment described above, the setting value of the screen transition setting 1808 may be managed by a setting file other than the record information 1800.

Moreover, in the embodiment described above, the user may be prompted to select an application screen for transition whenever he or she depresses a record.

In the embodiment described above, the screen transition setting is not always determined using the selection screen 1700 in the process in FIG. 16, but may be determined from user's operation histories. For example, when an instruction to execute a print job for which print setting information have been changed although a file or folder has not been changed is received from the same user, the CPU 102 configures the screen transition setting at the job setting. When an instruction to execute a print job for which have been specified with a different file stored in the same folder although print setting information have not been changed is received from the same user, the CPU 102 configures the screen transition setting at the file selections screen.

In the embodiment described above, not the no-file error screen but an icon or message indicating that the designated file is not present in the designated folder may be displayed in the step S2104, and furthermore, the selected record may be deleted from the timeline 513.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-085204, filed Apr. 26, 2018, which is hereby incorporated by reference herein in its entirety.

What is claimed is:

1. A printing apparatus comprising:
a button display control unit configured to display a history button for calling data printed in the past and print setting information used when the data was printed, wherein at least a part of a character string for identifying the data is further displayed on the history button;
and
a control unit configured to, when a user has selected the history button on which the part of the character string for identifying the data is not displayed, display a notification screen that displays all of the character string for identifying the data to be printed,
wherein the notification screen is not displayed when the user has selected the history button on which all of the character string is displayed.

2. The printing apparatus according to claim 1, wherein the character string is an absolute path indicating a name and a storage location of the data.

3. The printing apparatus according to claim 1, wherein the control unit displays a print setting screen without displaying the notification screen when the user has selected the history button on which all of the character string is displayed, and wherein the print setting screen is a screen for issuing an instruction to start printing using the print setting information corresponding to the selected history button, and
wherein the control unit displays the notification screen before displaying the print setting screen when the user has selected the history button on which a part of the character string is not displayed.

4. The printing apparatus according to claim 1, wherein the control unit displays a print setting screen without displaying the notification screen when the user has selected the history button on which all of the character string is displayed, and wherein the print setting screen is a screen for issuing an instruction to start printing using the print setting information corresponding to the selected history button, and
wherein the control unit displays the notification screen in such a manner as to cover at least a part of the print setting screen when the user has selected the history button on which a part of the character string is not displayed.

5. A control method for a printing apparatus, the method comprising:
displaying a history button for calling data printed in the past and print setting information used when the data was printed, wherein at least a part of a character string for identifying the data is further displayed on the history button;
and
displaying a notification screen that displays all of the character string for identifying the data to be printed when a user has selected the history button on which the part of the character string is not displayed,
wherein the notification screen is not displayed when the user has selected the history button on which all of the character string is displayed.

6. A non-transitory computer-readable storage medium storing a program for causing a computer to execute a control method for a printing apparatus, the control method comprising:
displaying a history button for calling data printed in the past and print setting information used when the data was printed, wherein at least a part of a character string for identifying the data is further displayed on the history button;
and
displaying a notification screen that displays all of the character string for identifying the data to be printed when a user has selected the history button on which the part of the character string is not displayed,
wherein the notification screen is not displayed when the user has selected the history button on which all of the character string is displayed.

* * * * *